(12) United States Patent
Poeppelmann et al.

(10) Patent No.: US 10,678,707 B2
(45) Date of Patent: Jun. 9, 2020

(54) DATA PROCESSING DEVICE AND METHOD FOR CRYPTOGRAPHIC PROCESSING OF DATA

(71) Applicant: Infineon Technologies AG, Neubiberg (DE)

(72) Inventors: Thomas Poeppelmann, Munich (DE); Stefan Hackenberg, Koenigsbrunn (DE); Stefan Heiss, Bobingen (DE); Markus Rau, Gessertshausen (DE); Stephan Wassmann, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 205 days.

(21) Appl. No.: 15/792,817

(22) Filed: Oct. 25, 2017

(65) Prior Publication Data
US 2018/0121369 A1 May 3, 2018

(30) Foreign Application Priority Data
Oct. 27, 2016 (DE) .................. 10 2016 120 558

(51) Int. Cl.
*G06F 12/14* (2006.01)
*G06F 21/75* (2013.01)
(Continued)

(52) U.S. Cl.
CPC ...... *G06F 12/1408* (2013.01); *G06F 11/1048* (2013.01); *G06F 12/0246* (2013.01);
(Continued)

(58) Field of Classification Search
CPC .............. G06F 12/1408; G06F 21/755; G06F 11/1048; G06F 12/0246; G06F 2221/2123;
(Continued)

(56) References Cited

U.S. PATENT DOCUMENTS 9,294,444 B2 * 3/2016 O'Hare ................ G06F 21/606
9,990,249 B2 * 6/2018 Durham .............. G06F 11/1004
(Continued)

OTHER PUBLICATIONS

"Methodology for cryptographic rating of memory encryption schemes used in smartcards and similar devices", Bundesamt für Sicherheit in der Informationstechnik, https://www.bsi.bund.de/SharedDocs/Downloads/DE/BSI/Zertifizierung/Interpretationen/AIS_46_MEGuide_e_pdf.pdf?_blob=publicationFile, Version 1.0, Oct. 31, 2013, retrieved on Jul. 21, 2017.

(Continued)

*Primary Examiner* — Mohammed Waliullah
(74) *Attorney, Agent, or Firm* — Viering, Jentschura & Partner MBB

(57) ABSTRACT

According to an embodiment, a data processing device is described comprising a deformer configured to deform a first data block in accordance with a first seed, a seed generator configured to generate a sequence of second seeds, wherein the sequence of second seeds comprises the first seed, a cryptographic processor configured to receive the deformed first data block and, for each second seed, to deform the deformed first data block in accordance with the second seed, to generate a sequence of second data blocks and to cryptographically process each second data block of the sequence of second data blocks to generate a sequence of processed data blocks and an extractor configured to extract a result of the cryptographic processing of the first data block from the sequence of processed data blocks.

21 Claims, 6 Drawing Sheets

(51) Int. Cl.
*H04L 9/06* (2006.01)
*G06F 11/10* (2006.01)
*G06F 12/02* (2006.01)
*G11C 16/34* (2006.01)
*G11C 7/10* (2006.01)

(52) U.S. Cl.
CPC ........ *G06F 21/755* (2017.08); *G11C 16/3427* (2013.01); *H04L 9/0662* (2013.01); *G06F 2212/202* (2013.01); *G06F 2221/2123* (2013.01); *G11C 7/1006* (2013.01)

(58) Field of Classification Search
CPC ............. G06F 2212/202; H04L 9/0662; G11C 16/3427; G11C 7/1006
See application file for complete search history.

(56) References Cited

U.S. PATENT DOCUMENTS

| | | | |
|---|---|---|---|
| 10,182,346 B2* | 1/2019 | Hwang | ................... H04L 9/065 |
| 2009/0323942 A1 | 12/2009 | Sharon et al. | |
| 2012/0166714 A1* | 6/2012 | Mun | ................... G11C 16/3418 711/103 |
| 2012/0297271 A1 | 11/2012 | Sommer et al. | |
| 2014/0310534 A1 | 10/2014 | Gurgi et al. | |

OTHER PUBLICATIONS

"Error detection and correction", Wikipedia, https://en.wikipedia.org/wiki/Error_detection_and_correction?oldid=744979495, Oct. 18, 2016, retrieved on Jul. 21, 2017.

"Linear rackgekoppeltes Schieberegister", Wikipedia, https://de.wikipedia.org/wiki/Linear_rückgekoppeltes_Schieberegister?oldid=157812700, (5 pages and 7 pages of the English version of the Wikipedia article), Sep. 10, 2016, retrieved on Jul. 21, 2017, English version retrieved on Oct. 25, 2017.

"Xorshift", Wikipedia, https://de.wikipedia.org/wiki/Xorshift, (4 pages and 4 pages of the English version of the Wikipedia article), retrieved on Oct. 26, 2016, English version retrieved on Oct. 25, 2017.

* cited by examiner

DATA PROCESSING DEVICE AND METHOD FOR CRYPTOGRAPHIC PROCESSING OF DATA

CROSS-REFERENCE TO RELATED APPLICATION

This application claims priority to German Patent Application Serial No. 10 2016 120 558.3, which was filed Oct. 27, 2016, and is incorporated herein by reference in its entirety.

TECHNICAL FIELD

The present disclosure relates to data processing devices and methods for cryptographic processing of data.

BACKGROUND

Electronic devices which process secure data, such as cryptographic keys, should be protected against attacks like fault attacks and side-channel analysis. One approach to counter attacks is the introduction of dummy calculations which are introduced in a processing flow. However, not only the execution of dummy operations but also the generation of dummy data to be processed in dummy operations costs processing power and it is therefore desirable to have approaches allowing an efficient generation of dummy data.

SUMMARY

According to an embodiment, a data processing device is provided comprising a deformer configured to deform a first data block in accordance with a first seed, a seed generator configured to generate a sequence of second seeds, wherein the sequence of second seeds comprises the first seed, a cryptographic processor configured to receive the deformed first data block and, for each second seed, to deform the deformed first data block in accordance with the second seed, to generate a sequence of second data blocks and to cryptographically process each second data block of the sequence of second data blocks to generate a sequence of processed data blocks and an extractor configured to extract a result of the cryptographic processing of the first data block from the sequence of processed data blocks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
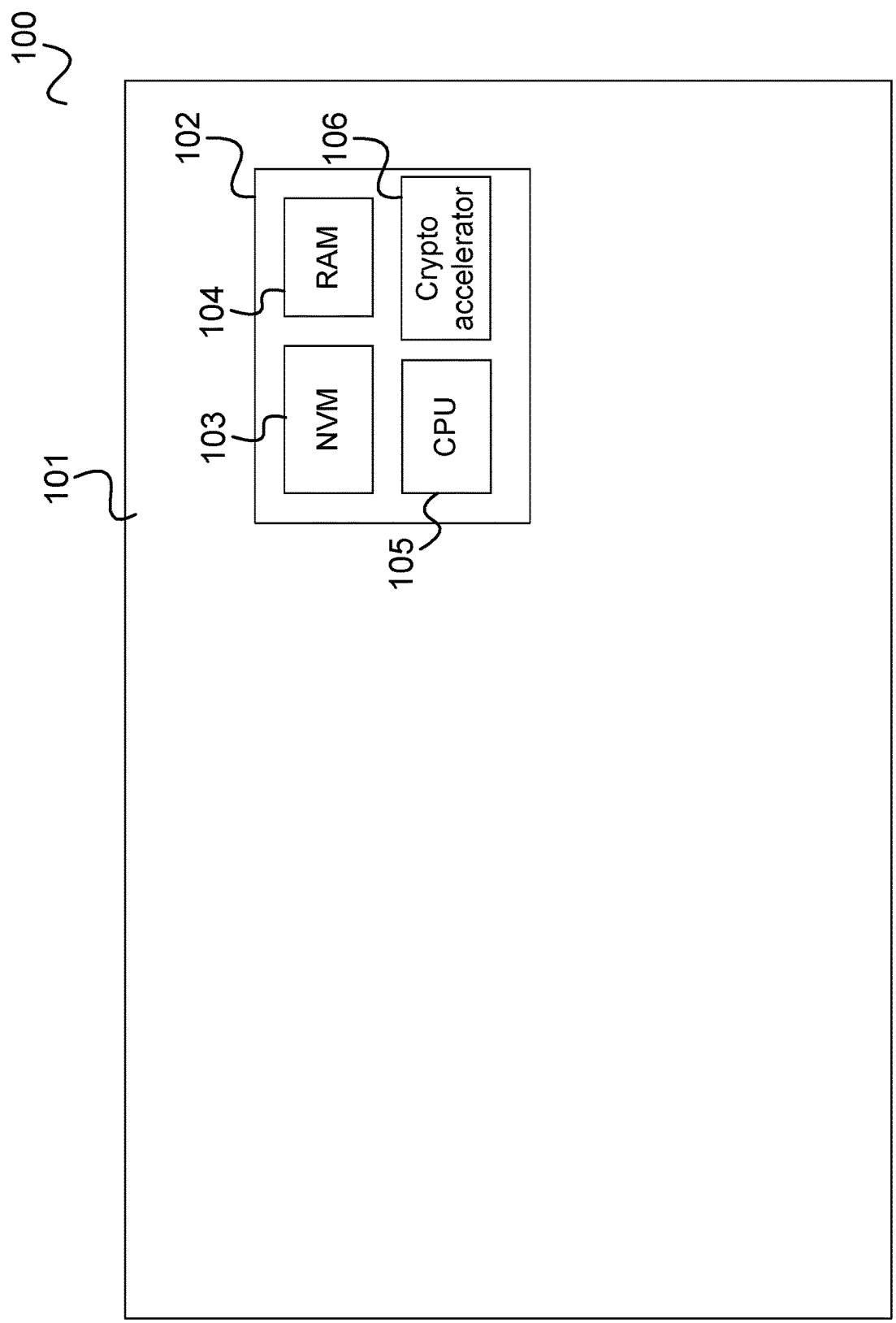
FIG. 1 shows a chip card.

FIG. 1 shows a chip card 100.

The chip card (or smart card) 100 includes a carrier and a chip card module 102. The chip card module includes various components such as a non-volatile memory 103, a volatile memory (e.g. a RAM) 104 and a CPU (central processing unit) 105. For performing cryptographic operations, the chip card module may include one or more cryptographic coprocessors 106, i.e. one or more crypto (graphic) accelerators or crypto(graphic) modules.

A cryptographic core, such as implemented by the crypto-coprocessor 106, should typically be efficiently secured against fault attacks and side-channel analysis (i.e., Differential Power Analysis (DPA)). One option for this is the implementation of masking to randomize an internal state in the processing of an implementation as well as double calculations, e.g., to protect an AES (Advanced Encryption Standard) implementation. However, a straightforward approach can lead to expensive implementations in terms of area and is also complicated to perform in terms of design efforts or simply not sufficient (due to higher-order attacks, fault attacks, or implementation errors). Moreover, sometimes it is better to use other approaches than masking to achieve high performance when executing a cryptographic core in a non-secure operation mode where non-security critical data has to be processed with high performance.

An approach to protect a cryptographic core against power analysis is, besides masking or power-balanced logic styles, is the use of dummy computations to introduce additional noise/trace misalignment. Dummy calculations can be used inside of the execution flow (i.e. dummy cycles or dummy blocks) of a cryptographic core (e.g. S-Box evaluation with dummy data) or on a higher level. In this case, a full dummy calculation of a cryptographic primitive (i.e., one AES encryption) is performed with dummy data (i.e., data (e.g. including useful data and key data) that differs from the real data) as dummy computation. This also allows hiding of double calculations to check for faults (e.g., introduced by lasers). As an example, a smart card 100 equipped with a hardware-based crypto accelerator 106 controlled by a program executed on the CPU 105 could calculate 16 cryptographic operations (e.g., AES encryption) where two operations work on the real data and 14 operations work on random data and where real and dummy operations are interleaved in a randomized fashion. To detect a fault, the CPU 105 can check whether the results of the two real computations match.

This approach still leaves the question of how to generate dummy data on a CPU in an efficient matter. Especially when considering secure coding rules the performance of a software that is generating input for dummies and real calculations as well as the checking (on shares) can be a burden and slow down the operation of the whole system (even with a very fast crypto accelerator).

Additionally, such a software-based approach requires a large number of data transfers between the CPU 105 and the cryptographic accelerator 106 so that performance might not be sufficient. Moreover, for common buffer widths the CPU 105 has to constantly feed the crypto-accelerator 106 with data or has to fetch and store the results and can thus not perform other tasks. Additionally, data transfer operations are typically visible in the power profile in such a system and the generation of random dummy data is expensive on a CPU. If the accelerator 106 does not support a masked transfer, an additional security issue is that the data has to be send in plain to the accelerator 106 where an attacker can probe the data (though, the attacker still has to distinct between dummy and real data). To detect forcing attacks know-answer-tests might be needed which are hard to hide inside a flow of dummy calculations.

In the following, approaches are described which address the aforementioned issues of efficient-CPU based dummy data generation for general purpose crypto accelerators and approaches are described for CPU-controlled but hardware accelerated dummy calculations by proposing an efficient partitioning of functions into software and hardware and their interaction. It should be noted that the approaches described in the following may not only be applied to chip card modules (such as the chip card module 102 of FIG. 1) but also to other secure elements, e.g. embedded secure elements (e.g. TPMs (Trusted Platform Modules)), implemented as integrated circuits, which may be packaged differently, e.g. are not mounted on a plastic card.

The approaches described in the following are independent of the actual cryptographic operation and can be used in combination with one or more crypto cores (included in a crypto accelerator or crypto module) for symmetric ciphers, e.g., AES, DES (Data Encryption Standard), hash functions, e.g., SHA(Secure Hash Algorithm)-1, SHA-2, SHA-3, stream ciphers like Achterbahn or Trivium, or, with some restrictions, public-key cryptography like ECC (Elliptic Curve Cryptography), RSA, or NTRU. A crypto core itself may or may not be equipped with security features like random masking, power-balanced logic styles, or error detection codes.

In the following, an approach for CPU-based dummy computation is described for usage of general purpose crypto accelerators (crypto modules) that might or might not allow the transfer of data (to be cryptographically processed, e.g. encrypted or decrypted) or cryptographic keys in shares. For this approach, no hardware support for the dummy data generation is required however, data transfers might cost performance. An example for a smart card or secure controller architecture is given in FIG. 2.

Figure 2:
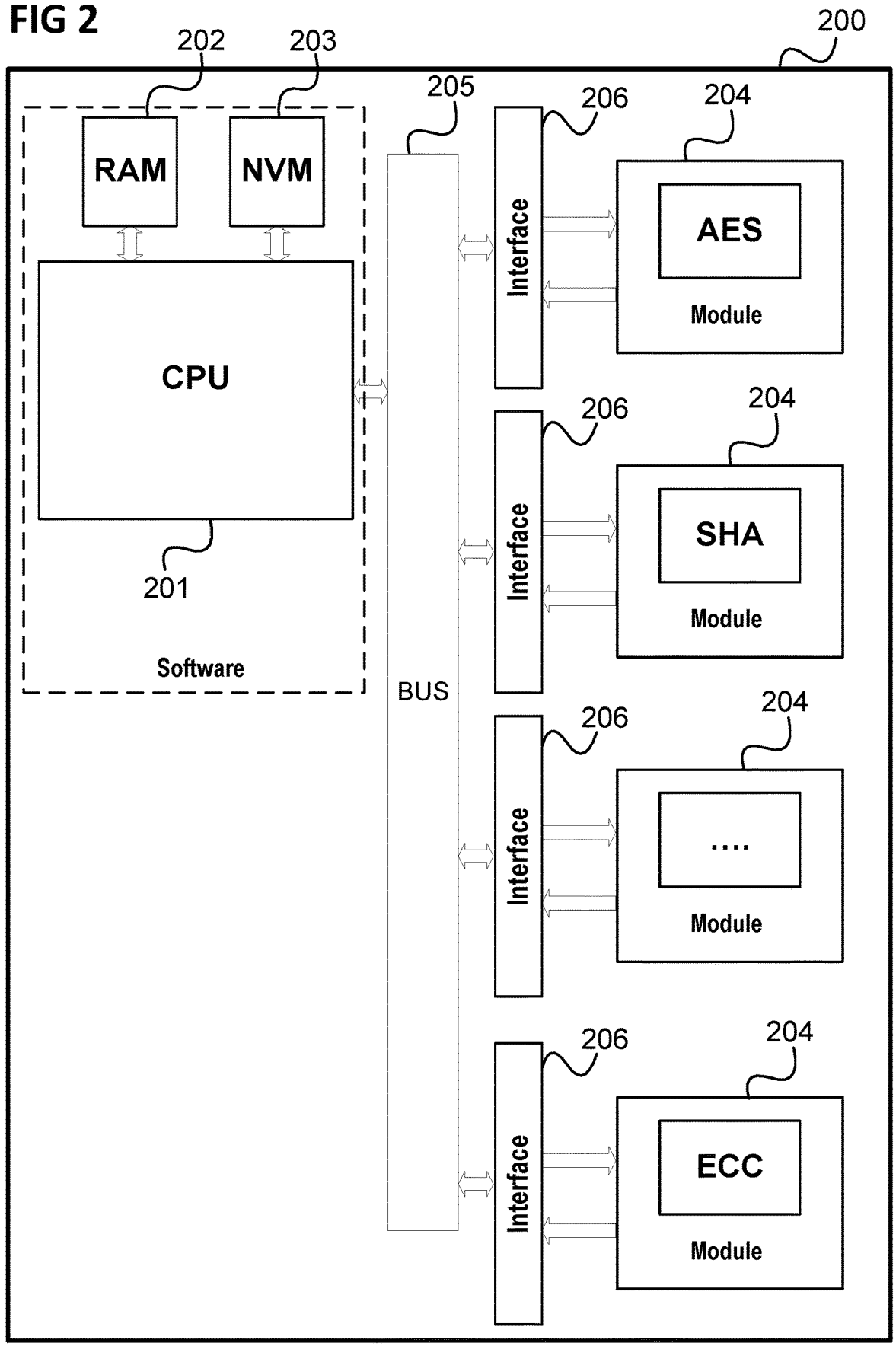
FIG. 2 shows a data processing device, e.g. a smart card or a secure controller, according to an embodiment.

FIG. 2 shows a data processing device 200, e.g. a smart card or a secure controller.

The device 200 includes a CPU 201, a RAM 202 and a non-volatile memory 203.

In this architecture the CPU 201 has access to various crypto modules 204 over a shared bus 205 to which each crypto module is coupled via a respective interface 206. Each crypto module 204 includes a crypto core to perform certain cryptographic operations (e.g. according to AES, SHA, ECC) and may or may not be equipped with hardware-based security features. The bus 205 itself may be masked or plain.

For the approach described in the following it is assumed that before performing a cryptographic operation masked (or plain) data to be processed (which may include useful data, e.g. to be encrypted or decrypted, or key data) are stored the device's memory, i.e. the NVM 203 or the RAM 202.

The device 200 (e.g. the CPU 201 based on a user input to the device 200) selects a random initial seed and initializes a linear PRNG (pseudo random number generator) in software, i.e. executed on the CPU 201.

The CPU 201 then uses the output of this PRNG to deform (in other words mask) the data to be processed by XORing it onto (i.e. XOR(exclusive OR)-combining it with) the data in the RAM 202 (possibly moved there first from the NVM 203). The CPU 201 then generates a randomized sequence of seeds (e.g. based on user input to the device). The CPU 201 selects these seeds in a particular way. In case the output of the PRNG seeded with seeds from the sequence is applied (i.e., XORed) to the previously deformed data then one seed of the sequence removes the deformation and leads to the original data (i.e. one seed of the sequence is the initial seed; the deformation of the deformed data with this seed restores the original data) while the other seeds of the sequence lead to an additional (second) deformation of the resulting data which then are used as dummy data. This means that when the initial seed is used for the second deformation (second masking) the real computation can be performed, as the data is (first) deformed when the PRNG based on the initial seed is applied, and when the other seeds are used for the second deformation, further deformed data is generated which may be used as randomized dummy data.

For example, two options may be used for the data transfer from the CPU to the crypto core.

Data Transfer Option 1: Unshared Data Transfer to Crypto Module

This option may be applied when the crypto modules 204 only support unshared data transfer.

According to this option, the device performs the following:

1. The data which is the input to a crypto core 204 (i.e. useful data or key data that is to be processed by a crypto core or Module 204 according to cryptographic operation) is stored in the RAM 202 or NVM 203 (either stored in a plain (single-share) or in a shared (multiple-share) representation).
2. The CPU 201 chooses a random initial seed r.
3. The CPU 201 deforms the original data on the CPU 201 by XORing the output of a PRNG (also referred to as SWD(Software Dummy)-PRNG) seeded by r resulting in deformed data (this can be seen as masking the data with the output of the PRNG).
4. The CPU 201 generates a random sequence of instructions. Each instruction contains a seed and one or more target buffer destinations in the RAM 202 (i.e. pointer addresses). One seed of the sequence is r.
5. The CPU 201 acts on each item of the sequence of instructions as follows:
    a. The CPU 201 copies the deformed data to a temporary location in RAM 202 or CPU registers.
    b. The CPU 201 XORs the output of the SWD-PRNG seeded by the seed in the instruction to the deformed data in the temporary location.
    c. The CPU 201 copies the data in the temporary location into the crypto module 204.
    d. The CPU 201 configures the crypto module 204 and instructs it to start the cryptographic operation.
    e. The CPU 201 stores the result obtained from the crypto module 204 by XORing it to one, two, or more buffers in RAM 202 designated in the instruction that are large enough to hold the output of the respective crypto module 204 (e.g., an AES ciphertext or a SHA-1 hash).

After all commands have been processed the CPU checks the buffers for consistency and obtains the result (or performs further computation on the shared representation).

Data Transfer Option 2: Shared Data Transfer to Crypto Module

This option may be applied when the crypto modules 204 support data transfer in multiple shares. In this example module input=in_share1 (first input share) XOR in_share2 (second input share) and/or module output=out_share1 (first output share) XOR out_share2 (second output share).

According to this option, the device 200 performs the following:

1. The data which are the input to a crypto core 204 (i.e. useful data or key data or both that are to be processed by a crypto core or Module 204 according to cryptographic operation) are stored in the RAM 202 or NVM 203 (either stored in a plain (single-share) or in a shared (multiple-share) representation).
2. The CPU 201 chooses a random initial seed r.
3. The CPU 201 deforms the original data on the CPU 201 by XORing the output of a PRNG (SWD-PRNG) seeded by r resulting in deformed data.
4. The CPU 201 generates a random sequence of instructions. Each instruction contains a seed and one or more target buffer destinations in the RAM (i.e. pointer addresses). One seed in the sequence is
5. The CPU 201 acts on each item of the sequence of instructions as follows:
   a. The CPU 201 copies the deformed data to the in_share1 input buffer of the crypto module (can be skipped if data is still or already present).
   b. The CPU 201 computes the output of the SWD-PRNG seeded by the seed in the instruction and copies this data into the in_share2 input buffer of the crypto module.
   c. The CPU 201 configures the crypto module 204 and instructs it to start the cryptographic operation.
   d. The CPU 201 stores the result obtained from the crypto module 204 by XORing it to one, two, or more buffers in RAM designated in the instruction that are large enough to hold the output of the respective crypto module 204 (e.g., an AES cipher text or a SHA-1 hash). In case also output shares are available the CPU 201 can store these shares independently (e.g. use one or more RAM buffers for out_share1 and one or more RAM buffers for out_share2).

After all commands have been processed, the CPU checks the buffers for consistency and obtains the result (or computes further on the shared representation).

It should be noted that even if embodiments are described based on crypto cores 204 being realized as hardware modules, corresponding embodiments can also be realized with a crypto core engine running in SW on the CPU 201. The term "crypto module" (or crypto accelerator) may therefore either refer to a crypto module realized in hardware or to a crypto core engine running in SW on a CPU.

In the following, an approach for CPU-controlled but hardware accelerated dummy calculations is described.

This approach may be seen on accelerating the dummy computation of the approach described above with reference to FIG. 2 in hardware.

For this, a crypto module is provided that supports a normal operation mode (NOM) for computation on non-security critical data and a dummy operation mode (DOM) for computation on security critical data.

Figure 3:
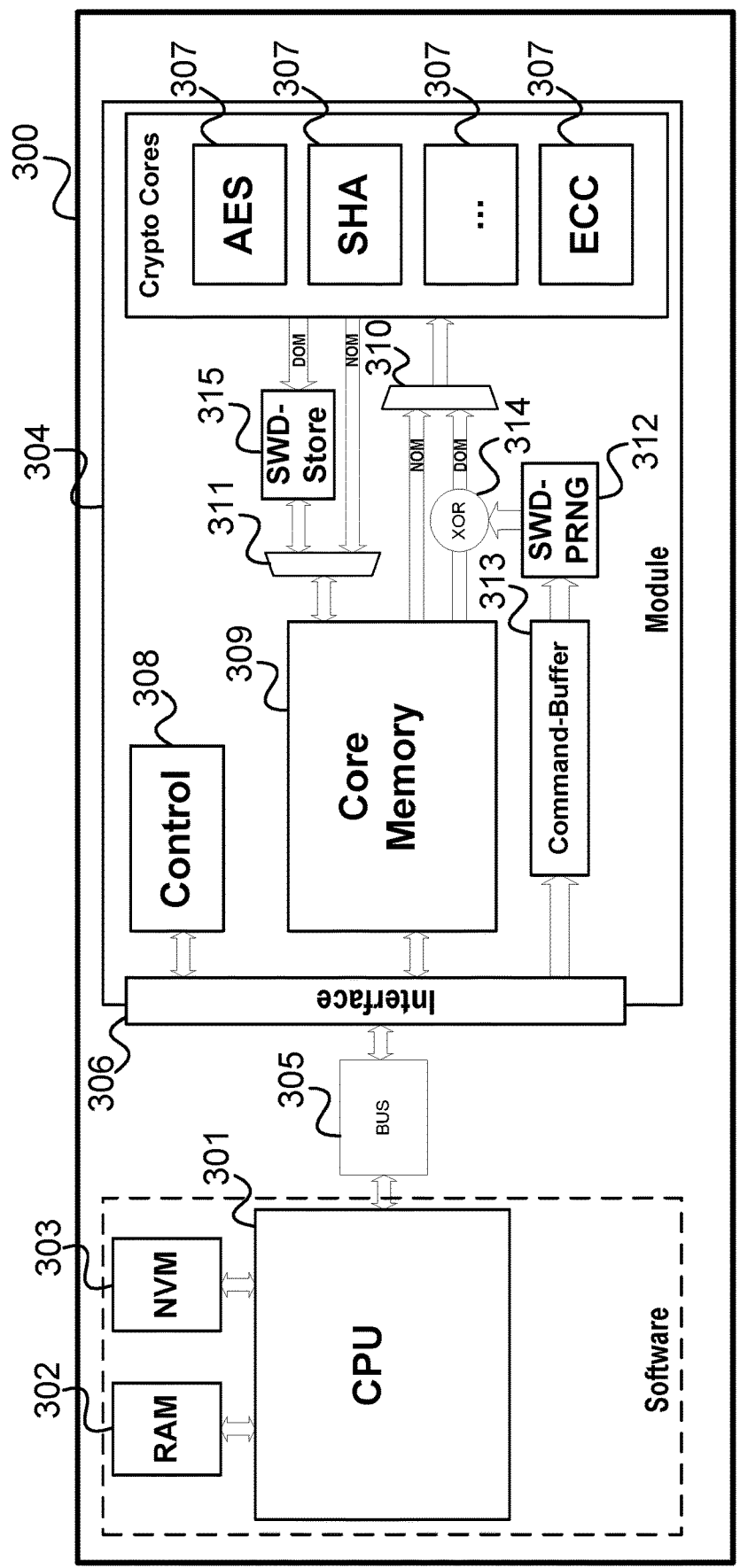
FIG. 3 shows a data processing device according to another embodiment.

FIG. 3 shows a data processing device 300, e.g. a smart card or a secure controller.

Similarly to the device 200 of FIG. 2, the device 300 includes a CPU 301, a RAM 302 and a non-volatile memory 303. The CPU 301 has access to a crypto module 304 over a bus 305 to which the crypto module 304 is coupled via an interface 306.

In this example, the crypto module 304 implements a plurality of crypto cores 307, wherein each crypto core is configured to perform respective cryptographic operations (e.g. according to AES, SHA, ECC).

The crypto module 304 further includes a controller 308 and a core memory 309.

The NOM can be seen as the usual operation mode: The data to be processed in NOM are written into the core memory 309, transferred into a crypto core via a first multiplexer 310, and the result is written back into the core memory 309 via a second multiplexer 311 where it can be accessed by the CPU 301.

In the DOM, the device 300 (e.g. the CPU 301, possibly based on user input to the device 300), places deformed data in the RAM 302 and then sends a sequence of seeds to the Core Module 304. These seeds are unrolled by using a linear PRNG (i.e., SWD-PRNG) 312 in the crypto module 304 which is feed with the seeds via a command buffer 313 coupled to the interface 306 and the output stream of the PRNG is XORed by a combiner 314 to the data when it is loaded into the crypto core via the first multiplexer 310. The data can be deformed on the CPU 301 in a way that one particular seed removes the deformation (i.e. such that real data is fed to the crypto core 307, e.g. hash core) while other seeds just deform the already deformed data again (i.e., pseudo-random dummy data is fed to the crypto core 307).

The result of an invocation of a crypto core 307 is always XORed to one, two, or more out of several output buffers by an SWD-Store unit 315 (e.g. configurable by the user) and a specific selection of target buffers allows the device (e.g. the CPU 301) to obtain the real calculation and to check the integrity of the dummy as well as real calculations. This approach allows realization of dummy and real calculations without the need to transfer the full (data size of all) input and/or output data blocks between the CPU 301 and the crypto module 304. Additionally, the data in the core memory 304 are transferred and stored in a deformed manner and can also be handled in shares in the CPU 301 (it is never stored in plain in a register) when the PRNG output is applied.

The device 300 for example performs the following to achieve protection against side-channel attacks:

1. The data which are the input to a crypto core 307 (e.g. including useful data or key data or both that are to be processed by a crypto core 307 according to cryptographic operation) are stored in the RAM 202 or NVM 203 (either stored in a plain (single-share) or in a shared (multiple-share) representation).
2. The CPU 301 configures the crypto module 307 for DOM.
3. The CPU 301 chooses a random seed r.
4. The CPU 301 deforms the data on the CPU 301 by XORing the output of a PRNG (SWD-PRNG) seeded by r to the data.
5. The CPU 301 copies the deformed data into the core memory 309 of the crypto module 304.
6. The CPU 301 generates a random sequence of commands. A command contains a seed and one or more result target buffer destinations. The seed in one of the commands is r. The CPU 301 sends these commands to the crypto module 304 where they can optionally be buffered in the command buffer 313, e.g., in a FIFO.

While the crypto module 304 is acting on a command, the CPU 301 performs other tasks, waits, or prepares new commands.

7. The crypto module 304 acts on a command as follows when using a plain interfaced crypto core hardware engine 307 (shared data transfer as described with reference to FIG. 2 can be realized also in hardware):
   a. the crypto module 304 loads the deformed data from the core memory 301 and
   b. applies the output of the SWD-PRNG 312 seeded by the seed in the present command (output by command buffer 313) to the deformed data and
   c. transfers the result into a crypto core 307 (for a matching seed this is the original data) and
   d. stores the result obtained from the crypto core 307 by XORing it to one, two, or more buffers (i.e., space in core memory 309) designated in the command that are large enough to hold the output of the respective crypto core 307 (e.g., an AES cipher text or a SHA-1 hash).

After all commands have been sent the CPU 301 reads out the buffers and checks the buffers for consistency.

To additionally protect against fault attacks a double calculation can be triggered in the processing of FIGS. 2 and 3. The CPU 201, 301 can achieve this by sending two commands with the same seed in the instruction sequence. This is referred to as Double-Dummy approach which only requires altering of the program executed on the CPU 201, 301. In this approach the CPU 201, 301 carries out 2 to 5 (of the processing described with reference to FIG. 2) or 3 to 7 (of the processing described with reference to FIG. 3) twice (i.e. in a pass one and a second two), where the CPU 201, 301 transfers freshly deformed data to the core module 204, 304 between pass one and pass two and where the result buffers are not cleared between pass one and pass two. The CPU 201, 301 selects the seeds in the commands in such a way that each deformed data block in pass one also appears in pass two at a randomized position in the sequence. As an example, for six double-dummies and four target buffers the device 200, 300 performs the following where Core(x)=c means that a crypto core 204, 307 is fed with data x and returns cipher text c:

CPU: Select random or data dependent seeds $s_1$, $s_2$, $s_3$, $s_4$, $s_5$ (wherein the CPU provides each seed XORed with r to the SWDPRNG to have a different seed sequence in each pass).
CPU: Configure the Module for DOM
Pass 1:
CPU: Select random or data dependent value r
CPU: Write d=data/key xor SWDPRNG(r) to core memory
CPU: Issue commands in randomized order (below is an example; randomize for each execution) such that the Module performs the following operations:
1. Core(d xor SWDPRNG($s_4$ xor r))=$c_4$ where $c_4$ is XORed to buffer 0 and buffer 3
2. Core(d x or SWDPRNG($s_1$ xor r))=$c_1$, where $c_1$ is XORed to buffer 1 and buffer 3
3. Core(d xor SWDPRNG($s_5$ xor r))=$c_5$ where $c_5$ is XORed to buffer 1 and buffer 3
4. Core(d xor SWDPRNG($s_3$ xor r))=$c_3$ where $c_3$ is XORed to buffer 1 and buffer 3
5. Core(d xor SWDPRNG(r))=c where c is XORed to buffer 0 and buffer 3
6. Core(d xor SWDPRNG($s_2$ xor r))=$c_2$ where $c_2$ is XORed to buffer 0 and buffer 3

The sequence of seeds provided to the SWDPRNG is in pass one thus $s_4$ XOR r, $s_1$ XOR r, $s_5$ XOR r, $s_3$ XOR r, r, $s_2$ XOR r.
Pass 2:
CPU: Select random value r'
CPU: Write d'=data/key xor SWDPRNG (r') to core memory
CPU: Issue commands in randomized order (below is an example; randomize for each execution) such that the Module performs the following operations:
7. Core(d' xor SWDPRNG($s_3$ xor r'))=$c_3$ where $c_3$ is XORed to buffer 0 and buffer 2
8. Core(d' xor SWDPRNG($s_4$ xor r'))=$c_4$ where $c_4$ is XORed to buffer 1 and buffer 2
9. Core(d' xor SWDPRNG(r'))=c where c is XORed to buffer 0 and buffer 2
10. Core(d' xor SWDPRNG($s_1$ xor r'))=$c_1$ where $c_1$ is XORed to buffer 0 and buffer 2
11. Core(d' xor SWDPRNG($s_2$ xor r'))=$c_2$ where $c_2$ is XORed to buffer 1 and buffer 2
12. Core(d' xor SWDPRNG($s_5$ xor r'))=$c_5$ where $c_5$ is XORed to buffer 0 and buffer 2

The sequence of seeds provided to the SWDPRNG is in this example thus $s_3$ XOR r', $s_4$ XOR r', r', $s_1$ XOR r', $s_2$ XOR r', $s_5$ XOR r'.

The computation is thus performed on real (original) data in operation 5 (pass 1) and operation 9 (pass 2) as the data was deformed with r (pass 1) and r' (pass 2) and the seed is in 5 and 9 also r or r', respectively, and thus the deformation is removed. For all other operations the data is re-randomized. In the end the content of the buffers is:

Buffer 0: $c_4$ xor c xor $c_2$ (after first pass) xor $c_3$ xor c xor $c_1$ xor $c_5$ (after second pass)
Buffer 1: $c_1$ xor $c_5$ xor $c_3$ (after first pass) xor $c_4$ xor $c_2$ (after second pass)
Buffer 2: $c_3$ xor $c_4$ xor c xor $c_1$ xor $c_2$ xor $c_5$ (only second pass)
Buffer 3: $c_4$ xor $c_1$ xor $c_5$ xor $c_3$ xor c xor $c_2$ (only first pass)

The CPU 201, 301 now loads the results stored in the buffers (in core memory 309 in case of the device 300) into the RAM 301, 302. To obtain the result of the real calculation c' (i.e. the calculation on the original data) the CPU 201, 301 performs the following:
c=Buffer 0 XOR Buffer 2=$c_4$ xor c xor $c_2$ xor $c_3$ xor c xor $c_1$ xor $c_5$ xor $c_3$ xor $c_4$ xor c xor $x_1$ xor $c_2$ xor $c_5$
c*=Buffer 1 XOR Buffer 3=$c_1$ xor $c_5$ xor $c_3$ xor $c_4$ xor $c_2$ xor $c_4$ xor $c_1$ xor $c_5$ xor $c_3$ xor c xor $c_2$
To detect fault attacks the CPU checks whether
c*=c
Buffer 2=Buffer 3
Another check would be to check whether Buffer 0=Buffer 1. However, this is redundant if the two other checks are performed.

An attacker does not know when the real (result c) and when the dummy calculations (result $c_1$) are performed in the respective pass. In each pass the order is randomized.

Thus an attacker can only introduce a fault if the fault is introduced into the corresponding computation in pass 1 and pass 2. Otherwise, the check detects this fault.

Note that it would also be possible to perform Pass 1 and Pass 2 without deforming the data in between (i.e. d=d').

For further security the commands that the CPU 201, 301 can provide a crypto module 304, 404 can be extended to allow triggering of a known-answer-test (KAT) in DOM. This way static or dynamic forcing of wires in a crypto core 304, 404 can be detected. For example, the commands can be extended with a trigger bit or by defining a special seed value (magic number) that triggers such a KAT computation. The KAT input data can be generated using a PRNG based on a fixed KAT-seed stored in a ROM, a KAT-seed supplied over an SFR (special function register), or by using the seed in the command as KAT-seed. It should be noted that the same semantic as for every other command can be used for storage of the result in the target buffers. To detect a fault the CPU 201, 301 can check whether KAT result data is present in the buffers as expected and removes it to obtain the real result (e.g. by XORing the stored results with the expected KAT result data).

Additionally, specific patterns in data might exist depending on the application that are also known to the attacker and not secret. Thus the distribution of the real and the dummy data differs which might be exploitable and allow an attacker to distinguish real and dummy data. Therefore, according to one embodiment, in the device 300 of FIG. 3, the CPU 301 may configure to which data blocks the SWD-PRNG 312 output should be XORed. For example, deformed data is split into several words of size 32-bit or 16-bit and written into the crypto core 307 in several cycles. When the SWD-PRNG 312 output is to be XORed to the deformed data, a bit-field (e.g. in the command provided by the CPU 301) indicates that the SWD-PRNG 312 output should be XORed to the first block if the first bit of the bit-field is set (or not set, depending on convention), and that the SWD-PRNG 312 output should be XORed to the second block if the second bit of the bit-field is set and so on. In this way, the CPU 301 may achieve that a data block having a certain pattern keeps this pattern and is not deformed (i.e. randomized).

In the following example the first block is always 0x0000 (e.g., known constant) and not secret, thus the CPU 301 controls that the output of the SWD-PRNG 312 is not applied while it is applied to the second block (e.g., of a key).

Decision Bit 0 1 . . .
Data 0x0000 0x1 837 . . .
SWD-PRNG 0xf376 0x6a52 . . .
Input to core 0x0000 0x7265 . . .

The same can be performed by the CPU in the device 200 of FIG. 2.

The crypto module 304 may for example be implemented based on a SHA module that supports SHA-1 and SHA-2. It may for example use a Marsaglia XORPRNG (affine or non-affine version are possible). However, any other linear PRNG can be employed as SWD-PRNG 312 to produce the data used to deform cipher texts. An instantiation with a non-linear PRNG is also possible.

In general the commands sent to the crypto module 304 can be either executed directly or stored in command buffer 313 which is for example a separate FIFO that can be written when the crypto module 304 is busy but the commands could also be stored in the core memory 309 if area should be saved and access conditions are satisfied. The deformed data and the target buffer can reside in a single memory (core memory 309) or several memories. The core memory 309 can be realized as a single-port memory where no access is allowed when the crypto module 304 is running or as a dual-port memory where in general access over the interface 305 is possible even when the crypto module 304 is executing crypto operations. The number of result target buffers can be smaller or larger than four for more flexibility. As additional security measure, buffers could be swapped after a write to a target buffer. The selection of target buffers can be protected by an additional mask.

Another realization could also include a unit that masks the output data from the crypto core 304 with a random data stream in SWD-STORE 315 using either the seed of the command or a seed provided to the crypto module 304 over a register. This way the result would be stored in a shared manner and the exposure of plaintext would be limited.

As previously mentioned other technical realizations could implement an AES, a SHA-3 or even an Elliptic Curve crypto core or also several cores (e.g., AES and SHA-1) and use the same principle. The length of the data blocks and the amount of data blocks may be adapted accordingly.

Several ways are possible to execute the approach of double dummy calculation and variations are possible how the seeds and permutations are generated in the CPU in a secure manner. The seed and random numbers can be obtained from a True RNG or be derived depending on the data (data-dependent seed). For higher security also a triple, quadruple, etc., dummy concept is possible where more protection against fault attacks may be achievable as the attacker has to guess even more positions.

The resistance against faults can be increased by using fault countermeasures in the crypto cores. Likewise the resistance against power analysis can be increased by using state-of-the-art power-analysis countermeasures in the crypto cores.

As results are XORed to target buffers it is possible to initialize the target buffers via software with some pre-defined value to increase randomness and to protect the transfer over the bus.

It would be possible that a crypto core provides an interface that accepts data in two shares.

Figure 4:
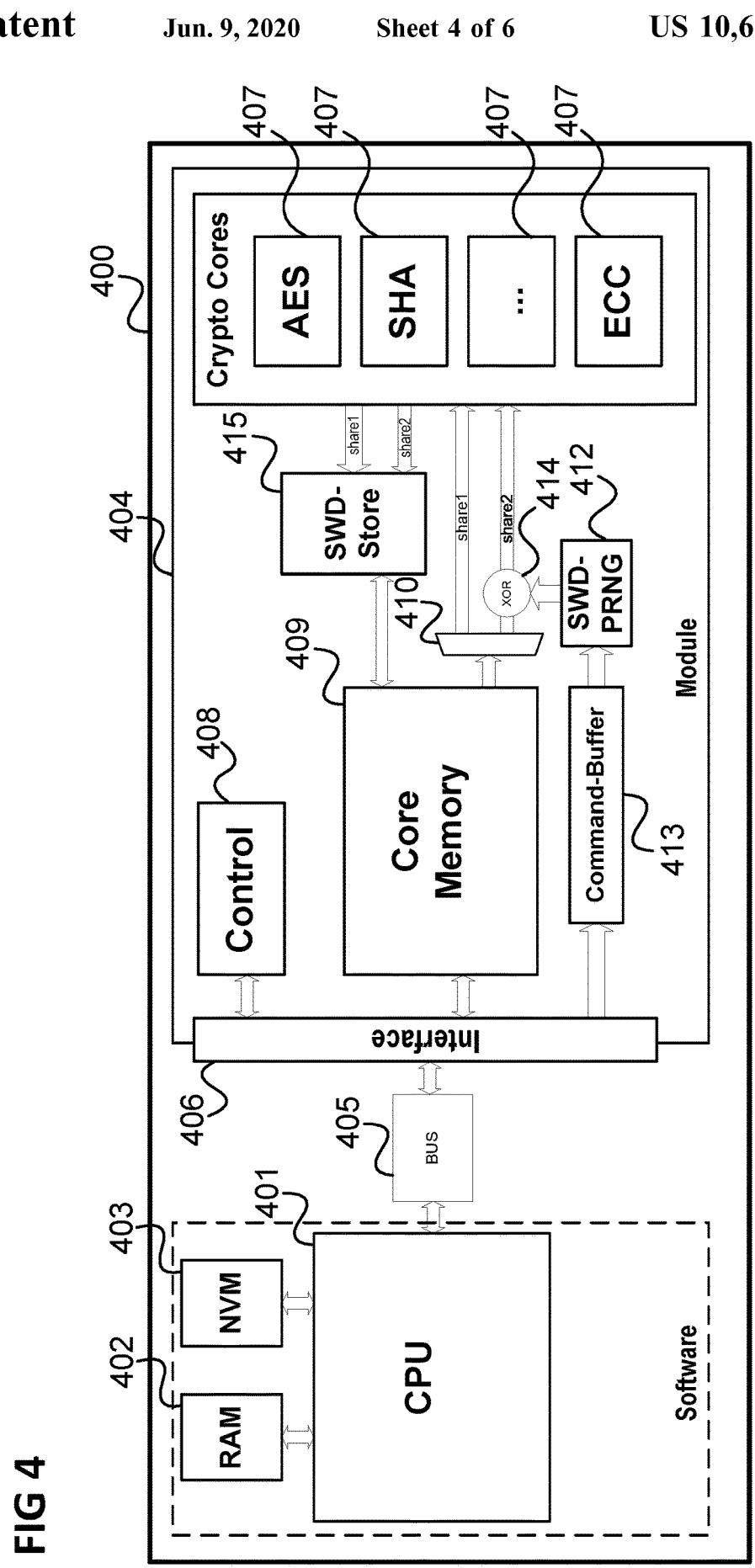
FIG. 4 shows a data processing device including crypto cores accepting data in shares.

FIG. 4 shows a data processing device 400, e.g. a smart card or a secure controller.

Similarly to the device 300 of FIG. 3, the device 400 includes a CPU 401, a RAM 402, a non-volatile memory 403, a bus 405, and a crypto module 404 having an interface 406, crypto cores 407 (assumed to be configured to receive a share 1 input and a share 2 input as well as configured to output two share outputs), a controller 408, a core memory 409, a command buffer 413, an SWD-PRNG 412, an XOR combiner 414 and an SWD-Store 315.

In this embodiment the deformed data from the core memory 409 is written, via a demultiplexer 316, as it is as share 1 input to the respective crypto core 407 and the deformed data combined by the XOR combiner 414 with the output of the SWD-PRNG 312 is written as share 2 input to the respective crypto core 407 (as described with reference to FIG. 2).

Additionally, the XOR combiner and the deforming of data by XORing the output of the PRNG could also be implemented using a different approach. As an example, the deformation of the original data can be done by adding the output of the PRNG (arithmetic addition modulo $2^n$, where n is the length of the output of the PRNG or the length of one output block). When a crypto module (e.g. implemented by a crypto coprocessor) is acting on a sequence of instructions and seeds, the output x of the PRNG could then be applied by adding $2^n-x$ modulo $2^n$ (arithmetic addition of $2^n$ minus x modulo $2^n$). This achieves the same result as the XOR where the original data is recovered and other (dummy) data is deformed a second time. Combining results by additions and subtractions is also possible.

Figure 5:
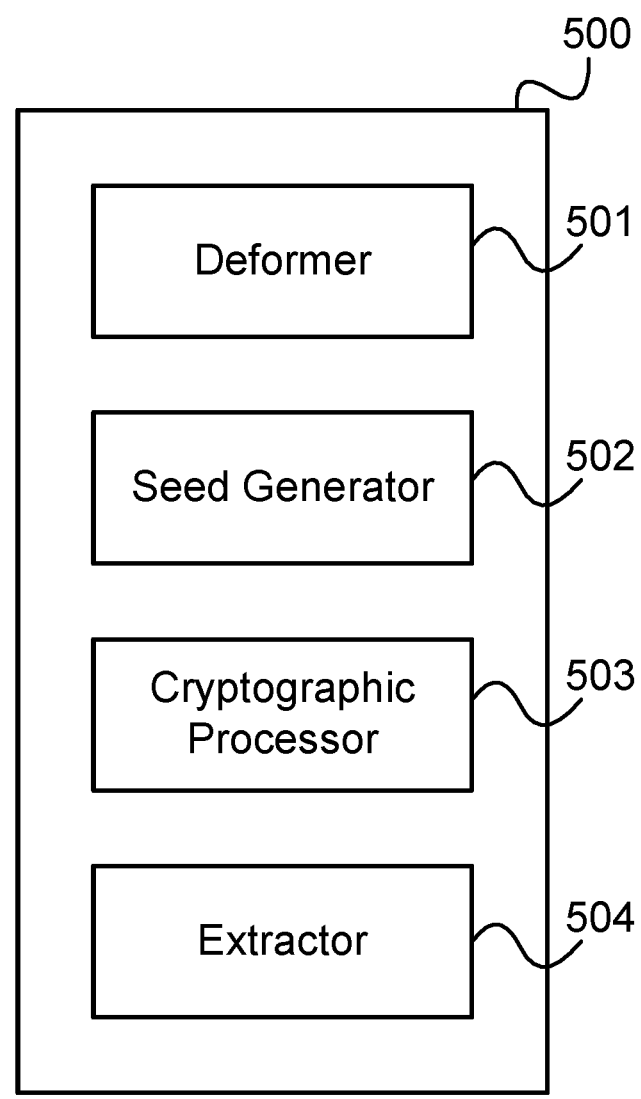
FIG. 5 shows a data processing device according to an embodiment.

In summary, according to various embodiments, a data processing device is provided as illustrated in FIG. 5.

FIG. 5 shows a data processing device 500.

The data processing device 500 includes a deformer 501 configured to deform a first data block in accordance with a first seed (e.g. a first random number generator seed) and a seed generator 502 configured to generate a sequence of second seeds (e.g. second random number generator seeds), wherein the sequence of second seeds includes the first seed.

Further, the data processing device 500 includes a cryptographic processor 503 configured to receive the deformed first data block and, for each second seed, to deform the deformed first data block in accordance with the second seed, to generate a sequence of second data blocks and to cryptographically process each second data block of the sequence of second data blocks to generate a sequence of processed data blocks.

Additionally, the data processing device 500 includes an extractor 504 configured to extract a result of the cryptographic processing of the first data block from the sequence of processed data blocks.

In other words, according to various embodiments, data to be cryptographically processed are deformed (i.e. masked) and the deformed data are used as a basis to generate a sequence of data (i.e. a sequence of data blocks, e.g. each of the size of the data to be cryptographically processed). Each data block of the sequence of data (blocks) is generated from the deformed data based on a corresponding seed of a sequence of seeds which in particular includes the seed based on which the data was deformed. The deformation is selected that deforming data twice with the same seed gives the original data (i.e. restores the original data block) such that the sequence of data blocks includes the original data block. The other data blocks of the sequence of data blocks serve as dummy data. This prevents attacks since an attacker does not know when in the cryptographic processing the original data and when the dummy data is processed. Further, faults may be detected by checking (e.g. comparing) the results of the processing.

It should be noted that deforming a data block in accordance with a seed may be understood as feeding a seed to a random number generator and using the random number generator output (in response to the seed) to deform the data block (e.g. by XORing the random number generator output with the data block). If the random number generators used by the deformer and the cryptographic processors differ, then the random number generators may in fact be supplied with different versions of the first seed but their output and the deformation based on their output is still understood to be in accordance with the first seed since the supplied seeds would be the same if the random number generators (and the associated deformation circuitry) was the same. In particular, the deformation by the deformer is understood to be in accordance with the first seed as it is included as one of the second seeds in the sequence of second seeds.

It should further be noted that a seed may not only characterize a random number sequence to be combined (e.g. XORed) to a data block but may also represent other deformations such as a reordering of data elements (e.g. bytes) of the data block etc. In other words, a seed may be seen as value characterizing a deformation, i.e. as an input to a deformer which performs a (pseudo-random) deformation in response to the seed.

The components of the data processing device (e.g. the deformer, the seed generator, cryptographic processor and the extractor) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". In particular, the components of the data processing device may be implemented by a single circuit, e.g. a processor with corresponding programming.

Figure 6:
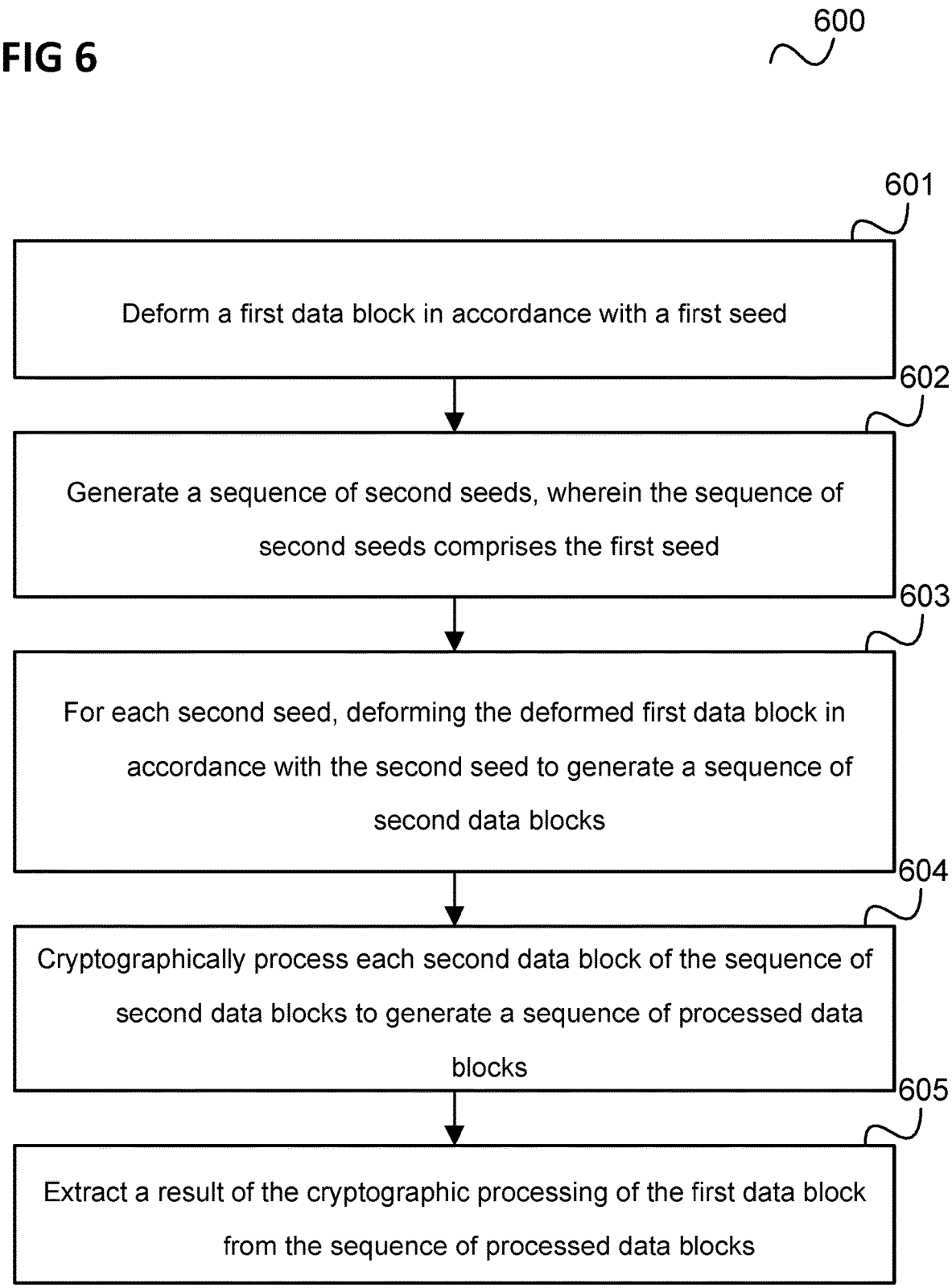
FIG. 6 shows a flow diagram illustrating a method for cryptographic processing of data.

The data processing device for example performs a method for cryptographic processing of data as illustrated in FIG. 6.

FIG. 6 shows a flow diagram 600.

In 601, a first data block is deformed in accordance with a first seed.

In 602, a sequence of second seeds is generated wherein the sequence of second seeds comprises the first seed.

In 603, for each second seed, the deformed first data block is deformed in accordance with the second seed to generate a sequence of second data blocks.

In 604, each second data block of the sequence of second data blocks is cryptographically processed to generate a sequence of processed data blocks.

In 606, a result of the cryptographic processing of the first data block is extracted from the sequence of processed data blocks.

It should be noted that 601 and 602 may also be performed in the different order than the one illustrated in FIG. 6.

Various Examples for embodiments that may be provided are given in the following:

Example 1 is a data processing device comprising a deformer configured to deform a first data block in accordance with a first seed; a seed generator configured to generate a sequence of second seeds, wherein the sequence of second seeds comprises the first seed; a cryptographic processor configured to receive the deformed first data block and, for each second seed, to deform the deformed first data block in accordance with the second seed, to generate a sequence of second data blocks and to cryptographically process each second data block of the sequence of second data blocks to generate a sequence of processed data blocks; and an extractor configured to extract a result of the cryptographic processing of the first data block from the sequence of processed data blocks.

Example 2 is the data processing device of Example 1, wherein the deforming of the first data block in accordance with the first seed and the deforming of the deformed first data block in accordance with the second seeds are configured such that the deforming of the deformed first data block with the first seed results in the first data block.

Example 3 is the data processing device of Example 1 or 2, wherein the deforming of the first data block in accordance with the first seed comprises at least partially XOR-combining the first data block with random numbers generated based on the first seed.

Example 4 is the data processing device of any one of Examples 1 to 3, wherein the deforming of the deformed first data block in accordance with the first seed comprises at least partially XOR-combining the first data block with random numbers generated based on the first seed.

Example 5 is the data processing device of any one of Examples 1 to 4, wherein the deforming of the first data block comprises leaving at least one non-secret part of the first data block undeformed.

Example 6 is the data processing device of any one of Examples 1 to 5, wherein the cryptographic processor is configured to execute a sequence of instructions, each instruction comprising a seed of the sequence of second seeds and instructing the cryptographic processor to cryptographically process the deformed first data block after deforming it in accordance with the seed.

Example 7 is the data processing device of any one of Examples 1 to 6, wherein the data to be cryptographically processed includes at least one of useful data and key data.

Example 8 is the data processing device of any one of Examples 1 to 7, wherein the first data block includes both useful data and key data and cryptographically processing the first data block comprises cryptographically processing the useful data in accordance with a key given by the key data.

Example 9 is the data processing device of any one of Examples 1 to 8, wherein the cryptographic processing includes at least one of encryption, decryption, and hash calculation.

Example 10 is the data processing device of any one of Examples 1 to 9, further comprising a combiner configured to at least partially combine the sequence of processed data blocks and a memory configured to store the combined sequence of processed data blocks.

Example 11 is the data processing device of Example 10, wherein the combining is an XOR combination.

Example 12 is the data processing device of any one of Examples 1 to 11, further comprising a fault detector configured to detect a fault based on the sequence of processed data blocks.

Example 13 is the data processing device of Example 12, wherein the fault detector is configured to detect a fault based on a comparison of processing results which are equal in case of no fault.

Example 14 is the data processing device of Example 12, wherein the fault detector is configured to detect a fault based on a comparison of a processing result with a known processing answer.

Example 15 is the data processing device of any one of Examples 1 to 14, wherein the seed generator is configured to generate a plurality of sequences of second seeds, wherein each of the plurality of sequences of second seeds comprises the first seed; wherein the deformer is configured to deform, for each sequence of second seeds, the first data block in accordance with a first seed; wherein the cryptographic processor is configured to, for each sequence of second seeds, receive the deformed first data block and, for each sequence of second seeds and for each second seed of the sequence of second seeds, to deform the deformed first data block in accordance with the second seed, to generate, for each sequence of second seeds, a sequence of second data blocks and to cryptographically process each second data block of the sequence of second data blocks to generate a sequence of processed data blocks; and wherein the fault detector is configured to detect a fault based on a comparison of the sequence of processed data blocks generated for the sequences of second seeds.

Example 16 is the data processing device of Example 15, wherein the first seeds are different for the sequences of second seeds.

Example 17 is the data processing device of Example 15, wherein the first seeds are the same for at least some of the sequences of second seeds.

Example 18 is the data processing device of any one of Examples 15 to 17, wherein the sequences of second seeds at least differ in the order of second seeds.

Example 19 is the data processing device of any one of Examples 15 to 18, further comprising a combiner configured to at least partially combine, for each sequence of second seeds, the sequence of processed data blocks, wherein the fault detector is configured to detect a fault based on a comparison of the combined sequences of processed data blocks generated for the sequences of second seeds.

Example 20 is the data processing device of Example 19, wherein the combiner is configured to, for each sequence of second seeds, generate a plurality of different combinations of the processed data blocks of the sequence of processed data blocks, and the fault detector is configured to detect a fault based on a comparison of combinations generated for the sequences of second seeds which are equal in case of no fault.

Example 21 is the data processing device of Example 19 or 20, wherein the combining is an XOR combination.

Example 22 is the data processing device of any one of Examples 1 to 21, wherein the deformer and the cryptographic processor comprise random number generators configured to generate random numbers based on the seeds.

Example 23 is the data processing device of any one of Examples 1 to 22, wherein the deformer and the cryptographic processor are implemented by different hardware circuits coupled via an interface, wherein the deformer is configured to provide the deformed masked data to the cryptographic processor via the interface.

Example 24 is a method for cryptographic processing of data comprising deforming a first data block in accordance with a first seed; generating a sequence of second seeds, wherein the sequence of second seeds comprises the first seed; for each second seed, deforming the deformed first data block in accordance with the second seed to generate a sequence of second data blocks; cryptographically processing each second data block of the sequence of second data blocks to generate a sequence of processed data blocks; and extracting a result of the cryptographic processing of the first data block from the sequence of processed data blocks.

According to a further example, a data processing device is provided configured to generate a sequence of data chunks, wherein each data chunk is generated from a deformed original data chunk by further deformation or restoration of the original data chunk (i.e. reverse deformation) and configured to cryptographically process each data chunk of the sequence of data chunks and at least one of determine the result of the cryptographic processing of the original data chunk or detect an attack on the data processing device based on the results of the cryptographic processing of the data chunks.

It should be noted that Examples described in context of a data processing device are analogously valid for the method for cryptographic processing of data and vice versa.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A data processing device comprising:
a deformer configured to deform a first data block in accordance with a first seed;
a seed generator configured to generate a sequence of second seeds, wherein at least one seed of the sequence of second seeds is the first seed;
a cryptographic processor configured to receive the deformed first data block and, for each second seed, to deform the deformed first data block in accordance with the second seed, to generate a sequence of second data blocks that comprise the first data block and dummy data for the cryptographic procedure, and to process each second data block of the sequence of second data blocks according to the cryptographic processing to generate a sequence of processed data blocks; and an extractor configured to extract a result of the cryptographic processing of the first data block from the sequence of processed data blocks;

further comprising a fault detector configured to detect a fault based on the sequence of processed data blocks;

wherein the seed generator is configured to generate a plurality of sequences of second seeds, wherein each of the plurality of sequences of second seeds comprises the first seed;

wherein the deformer is configured to deform, for each sequence of second seeds, the first data block in accordance with a first seed;

wherein the cryptographic processor is configured to, for each sequence of second seeds, receive the deformed first data block and, for each sequence of second seeds and for each second seed of the sequence of second seeds, to deform the deformed first data block in accordance with the second seed, to generate, for each sequence of second seeds, a sequence of second data blocks and to cryptographically process each second data block of the sequence of second data blocks to generate a sequence of processed data blocks; and wherein the fault detector is configured to detect a fault based on a comparison of the sequence of processed data blocks generated for the sequences of second seeds.

2. The data processing device of claim 1, wherein the deforming of the first data block in accordance with the first seed comprises at least partially XOR-combining the first data block with random numbers generated based on the first seed.

3. The data processing device of claim 1, wherein the deforming of the deformed first data block in accordance with the first seed comprises at least partially XOR-combining the first data block with random numbers generated based on the first seed.

4. The data processing device of claim 1, wherein the deforming of the first data block comprises leaving at least one non-secret part of the first data block undeformed.

5. The data processing device of claim 1, wherein the cryptographic processor is configured to execute a sequence of instructions, each instruction comprising a seed of the sequence of second seeds and instructing the cryptographic processor to cryptographically process the deformed first data block after deforming it in accordance with the seed.

6. The data processing device of claim 1, wherein the data to be cryptographically processed includes at least one of useful data and key data.

7. The data processing device of claim 1, wherein the first data block includes both useful data and key data and cryptographically processing the first data block comprises cryptographically processing the useful data in accordance with a key given by the key data.

8. The data processing device of claim 1, wherein the cryptographic processing includes at least one of encryption, decryption, and hash calculation.

9. The data processing device of claim 1, further comprising a combiner configured to at least partially combine the sequence of processed data blocks and a memory configured to store the combined sequence of processed data blocks.

10. The data processing device of claim 9, wherein the combining is an XOR combination.

11. The data processing device of claim 1, wherein the fault detector is configured to detect a fault based on a comparison of processing results which are equal in case of no fault.

12. The data processing device of claim 1, wherein the fault detector is configured to detect a fault based on a comparison of a processing result with a known processing answer.

13. The data processing device of claim 1, wherein the first seeds are different for the sequences of second seeds.

14. The data processing device of claim 1, wherein the first seeds are the same for at least some of the sequences of second seeds.

15. The data processing device of claim 1, wherein the sequences of second seeds at least differ in the order of second seeds.

16. The data processing device of claim 1, further comprising a combiner configured to at least partially combine, for each sequence of second seeds, the sequence of processed data blocks, wherein the fault detector is configured to detect a fault based on a comparison of the combined sequences of processed data blocks generated for the sequences of second seeds.

17. The data processing device of claim 16, wherein the combiner is configured to, for each sequence of second seeds, generate a plurality of different combinations of the processed data blocks of the sequence of processed data blocks, and the fault detector is configured to detect a fault based on a comparison of combinations generated for the sequences of second seeds which are equal in case of no fault.

18. The data processing device of claim 16, wherein the combining is an XOR combination.

19. The data processing device of claim 1, wherein the deformer and the cryptographic processor comprise random number generators configured to generate random numbers based on the seeds.

20. The data processing device of claim 1, wherein the deformer and the cryptographic processor are implemented by different hardware circuits coupled via an interface, wherein the deformer is configured to provide the deformed masked data to the cryptographic processor via the interface.

21. A method for cryptographic processing of data comprising:

deforming a first data block in accordance with a first seed;

for each second seed, deforming the deformed first data block in accordance with the second seed to generate a sequence of second data blocks that comprise the first data block and dummy data for the cryptographic procedure;

processing each second data block of the sequence of second data blocks according to the cryptographic processing to generate a sequence of processed data blocks;

extracting a result of the cryptographic processing of the first data block from the sequence of processed data blocks;

detecting a fault based on the sequence of processed data blocks;

generating a plurality of sequences of second seeds, wherein each of the plurality of sequences of second seeds comprises the first seed;

deforming, for each sequence of second seeds, the first data block in accordance with a first seed;

receiving, for each sequence of second seeds, the deformed first data block and, deforming, for each sequence of second seeds and for each second seed of the sequence of second seeds, the deformed first data block in accordance with the second seed, to generate, for each sequence of second seeds, a sequence of second data blocks and to cryptographically process each second data block of the sequence of second data blocks to generate a sequence of processed data blocks; and detecting a fault based on a comparison of the sequence of processed data blocks generated for the sequences of second seeds.

\* \* \* \* \*